(12) United States Patent
Ono

(10) Patent No.: US 9,697,632 B2
(45) Date of Patent: Jul. 4, 2017

(54) INFORMATION PROCESSING APPARATUS, INFORMATION PROCESSING METHOD, AND PROGRAM

(71) Applicant: SONY CORPORATION, Tokyo (JP)

(72) Inventor: Junya Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 146 days.

(21) Appl. No.: 14/605,033

(22) Filed: Jan. 26, 2015

(65) Prior Publication Data
US 2015/0221114 A1  Aug. 6, 2015

(30) Foreign Application Priority Data
Feb. 4, 2014  (JP) .................................. 2014-019360

(51) Int. Cl.
 *G06T 19/00* (2011.01)
 *G06T 11/60* (2006.01)
 *G11B 27/10* (2006.01)

(52) U.S. Cl.
 CPC ............ *G06T 11/60* (2013.01); *G11B 27/105* (2013.01)

(58) Field of Classification Search
None
See application file for complete search history.

(56) References Cited

U.S. PATENT DOCUMENTS

| | | | | |
|---|---|---|---|---|
| 9,042,595 B2 * | 5/2015 | Watanabe | ............... | G06T 11/60 345/156 |
| 2004/0201633 A1 * | 10/2004 | Barsness | ........... | G06F 17/30716 715/864 |
| 2004/0252888 A1 * | 12/2004 | Bargeron | ............... | G06K 9/222 382/188 |
| 2005/0075544 A1 * | 4/2005 | Shapiro | ................. | G06F 19/322 600/300 |
| 2005/0183005 A1 * | 8/2005 | Denoue | ................ | G06F 17/241 715/202 |
| 2010/0034442 A1 * | 2/2010 | Minakuchi | .......... | G06F 19/3487 382/128 |
| 2014/0237357 A1 * | 8/2014 | Meyer | ................... | G06F 3/0483 715/273 |

FOREIGN PATENT DOCUMENTS

JP 2010-021638 A 1/2010

\* cited by examiner

*Primary Examiner* — David H Chu
(74) *Attorney, Agent, or Firm* — Chip Law Group

(57) ABSTRACT

There is provided an information processing apparatus including an output control unit configured to display a sign indicating an indication relationship between a first point associated with tag information and a second point specified by a user in content in a manner that the sign is superimposed over the content, and output input information input by the user and contained in the tag information.

17 Claims, 17 Drawing Sheets

| CONTENT TYPE | DATE | PLACE | EVENT SUMMARY |
|---|---|---|---|
| IMAGE | 2013/01/20 | YEBISU GARDEN PLACE | ANNIVERSARY |

400 402 404 406

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2014-019360 filed Feb. 4, 2014, the entire contents of which are incorporated herein by reference.

BACKGROUND

The present disclosure relates to an information processing apparatus, an information processing method, and a program.

A technology for attaching information to content in the form of, for example, a moving image and displaying the information or outputting the information in the form of voice has been developed.

For example, JP 2010-021638A describes a technology for recognizing user speech obtained during capturing of an image using an image capturing unit, extracting words from the recognized speech, and attaching, as tag information, the extracted words to an image frame obtained when the speech is recognized.

SUMMARY

According to the technology described in JP 2010-021638A, it is difficult for a user to understand a relationship between the content and the tag information attached to the content. For example, in the technology described in JP 2010-021638A, when the tag information attached to an image frame is displayed together with the image frame, the tag information is displayed in the image frame as an independent point. Accordingly, if the tag information includes information based on a certain relationship, such as, human speech, it is difficult for a viewer of the image frame to determine which position in the image frame has a relationship with the tag information.

According to an embodiment of the present disclosure, there is provided a novel and improved information processing apparatus, an information processing method, and a program capable of displaying tag information so that the viewer easily recognizes a relationship between the content and the tag information associated with the content.

According to an embodiment of the present disclosure, there is provided an information processing apparatus including an output control unit configured to display a sign indicating an indication relationship between a first point associated with tag information and a second point specified by a user in content in a manner that the sign is superimposed over the content, and output input information input by the user and contained in the tag information.

According to another embodiment of the present disclosure, there is provided an information processing method including displaying a sign indicating an indication relationship between a first point associated with tag information and a second point specified by a user in content in a manner that the sign is superimposed over the content, and causing a processor to output input information input by the user and contained in the tag information.

According to still another embodiment of the present disclosure, there is provided a program for causing a computer to function as an output control unit configured to display a sign indicating an indication relationship between a first point associated with tag information and a second point specified by a user in content in a manner that the sign is superimposed over the content, and output input information input by the user and contained in the tag information.

As described above, according to one or more of embodiments of the present disclosure, tag information can be displayed so that a relationship between content and tag information associated with the content can be easily understood by a viewer. It should be noted that the advantage is not limited to the advantages described herein, but may be any one of the advantages described in the present disclosure.

BRIEF DESCRIPTION OF THE DRAWINGS

FIG. 19 illustrates an example of the structure of a slot table according to the modification.

DETAILED DESCRIPTION OF THE EMBODIMENT(S)

Figure 1:
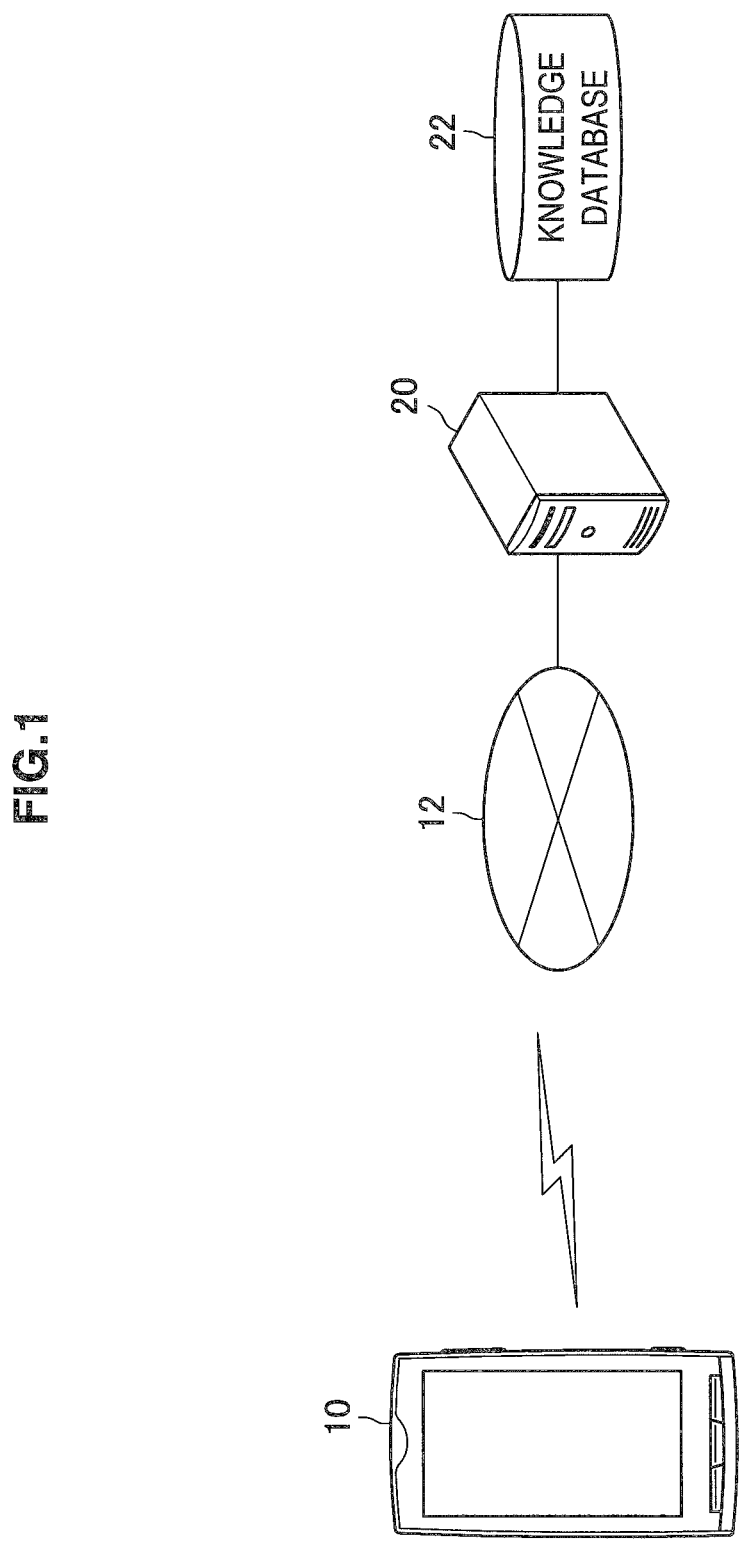
FIG. 1 illustrates the basic configuration of an information processing system according to an exemplary embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that descriptions below will be provided in the following order of chapters and sections:
1. Basic Configuration of Information Processing System
1.1. Information Processing Apparatus 10
1.2. Communication Network 12
1.3. Server 20
2. Detailed Description of Embodiments
2-1. Configuration
2-2. Operations
2-3. Effects
3. Modifications <<1. Basic Configuration Of Information Processing System>>

The present disclosure can be achieved in a variety of forms as illustrated in detail in the chapter "2. Detailed Description of Embodiments", for example. The basic configuration of the information processing system according to an exemplary embodiment is described first with reference to FIG. 1.

As illustrated in FIG. 1, according to the present exemplary embodiment, the information processing system includes an information processing apparatus 10, a communication network 12, and a server 20.

<1-1. Information Processing Apparatus 10>

For example, the information processing apparatus 10 is an apparatus capable of displaying content, such as a still image or a moving image, on a display screen. Examples of the information processing apparatus 10 include a personal computer (PC), a cell phone, such as a smart phone, a tablet, a digital camera, a wearable computer, and a game machine.

In addition, the information processing apparatus 10 is capable of, upon receiving input information, such as speech or text, from a user, generating tag information including the input information in association with some position in the content (hereinafter also referred to as a "tagged position"). The tag information contains, for example, the input information, such as user speech and text, a point in time at which the tag information is associated with the content, a tagged position, a position which is specified by the user and which the tag information points to in the content described below (hereinafter, the position is also referred to as an "indication position") or the level of importance of the tag information described below. Note that the tagged position is an example of a first point according to the present disclosure, and the indication position is an example of a second point according to the present disclosure.

Figure 2:
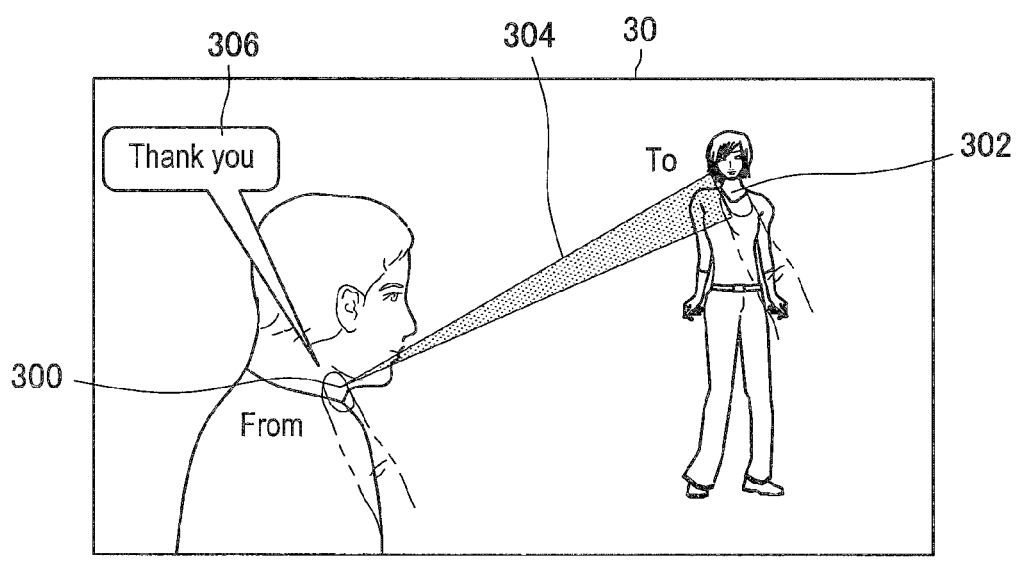
FIG. 2 illustrates an example of displaying a tag indication sign on a still image according to the exemplary embodiment.

For example, FIG. 2 illustrates an example in which tag information is associated with a still image 30 which is an example of content. In the example illustrated in FIG. 2, the speech "Thank you" is input from the user into the information processing apparatus 10, and the position of "From" is specified as a tagged position 300 by the user. In this case, the information processing apparatus 10 can generate tag information including the input speech in association with the tagged position 300.

Note that the text "From" and "To" are illustrated in FIG. 2 for convenience of description. In reality, the text does not appear. Similarly, although, for example, the text "From" or "To" is illustrated in FIGS. 5 to 12, the text does not appear, in reality.

[1-1-1. Hardware Configuration]

Figure 3:
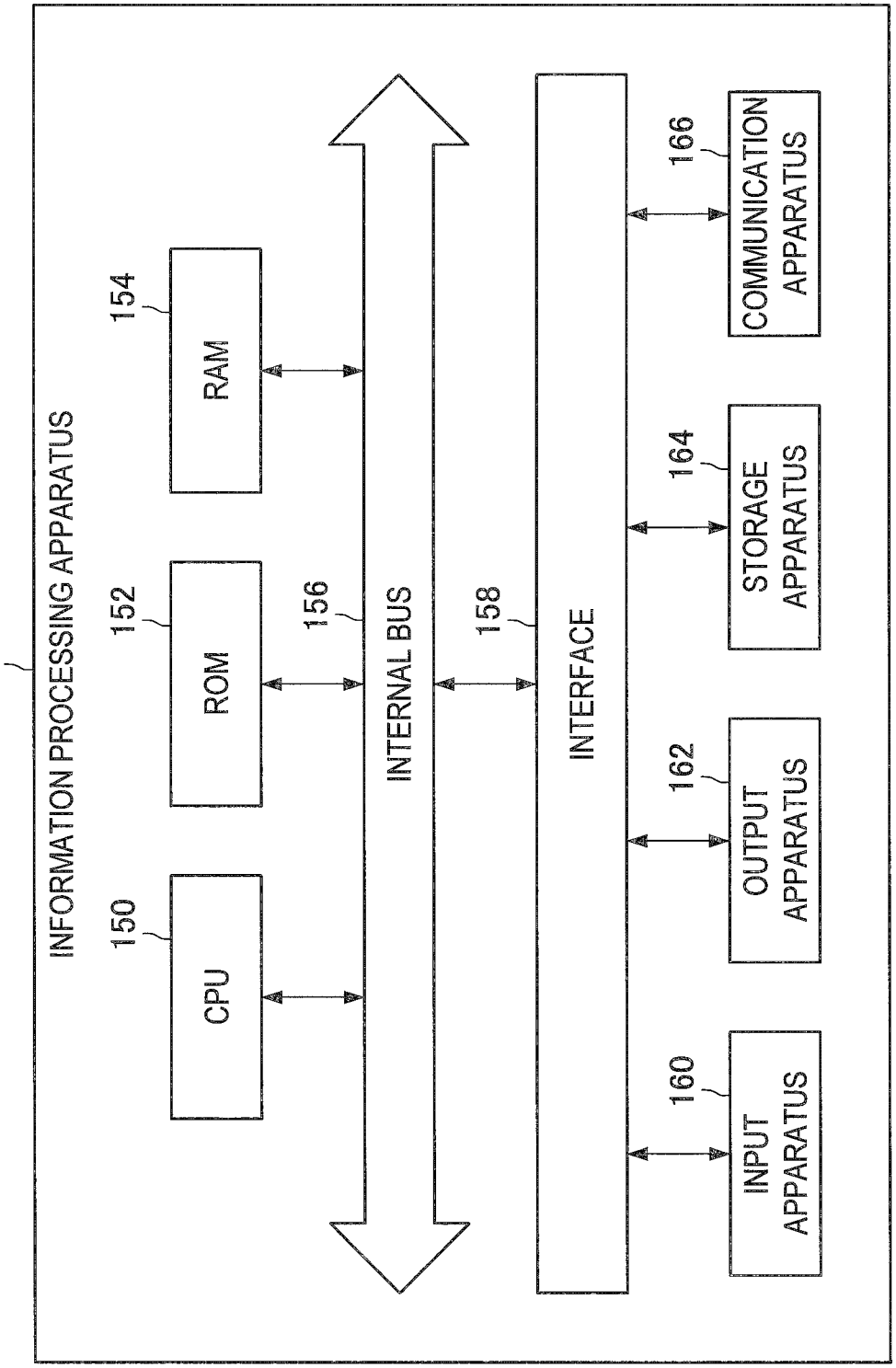
FIG. 3 illustrates a hardware configuration of the information processing apparatus 10 according to the exemplary embodiment.

Note that for example, the information processing apparatus 10 has a hardware configuration illustrated in FIG. 3. As illustrated in FIG. 3, the information processing apparatus 10 includes a central processing unit (CPU) 150, a read only memory (ROM) 152, a random access memory (RAM) 154, an internal bus 156, an interface 158, an input apparatus 160, an output apparatus 162, a storage apparatus 164, and a communication apparatus 166.

(1-1-1-1. CPU 150)

The CPU 150 functions as an arithmetic processing unit and a control unit. The CPU 150 performs overall control of the operations performed by the information processing apparatus 10 in accordance with a variety of programs. In addition, the CPU 150 realizes the function of a control unit 100 of the information processing apparatus 10. Note that the CPU 150 is formed from a processor, such as a microprocessor.

(1-1-1-2. ROM 152)

The ROM 152 stores the programs and control data, such as arithmetic parameters, used by the CPU 150.

(1-1-1-3. RAM 154)

The RAM 154 temporarily stores, for example, the programs executed by the CPU 150.

(1-1-1-4. Interface 158)

The interface 158 connects each of the input apparatus 160, the output apparatus 162, the storage apparatus 164, and the communication apparatus 166 to the internal bus 156. For example, the output apparatus 162 exchanges data with the CPU 150 via the interface 158 and the internal bus 156.

(1-1-1-5 Input Apparatus 160)

The input apparatus 160 is configured as an example of an input unit 134 described below. The input apparatus 160 is formed from, for example, an input device, such as a touch panel, a button, a microphone, and a switch, used by a user to input information and an input control circuit that generates an input signal on the basis of the input from the user and outputs the input signal to the CPU 150. The user can input a variety of data to the information processing apparatus 10 and instruct the information processing apparatus 10 to start processing by operating the input apparatus 160.

(1-1-1-6 Output Apparatus 162)

The output apparatus 162 includes a display device, such as a liquid crystal display (LCD), an organic light emitting diode (OLED) display, or a lamp. The display device displays, for example, an image generated by the CPU 150.

The output apparatus 162 further includes an audio output device, such as a speaker. The audio output device converts, for example, audio data into sound and outputs the sound.

(1-1-1-7 Storage Apparatus 164)

The storage apparatus 164 stores data. The storage apparatus 164 includes, for example, a storage medium, a recording device that records data on the storage medium, a readout device that reads data out of the storage medium, or a deleting device that deletes data stored in the storage medium.

(1-1-1-8 Communication Apparatus 166)

The communication apparatus 166 serves as a communication interface formed from a communication device that connects to, for example, a public network and the Internet. The communication apparatus 166 may be a wireless local area network (LAN) communication device, a long term evolution (LTE) communication device, or a wired communication device that communicates data by wire.

<1-2 Communication Network 12>

The communication network 12 serves as a wired or wireless transmission channel for information send from devices connected to the communication network 12. For example, the communication network 12 may include a public network, such as the Internet, a telephone network, or a satellite communication network, and a variety of LANs including Ethernet (trade name) and a wide area network (WAN). In addition, the communication network 12 may include a leased line network, such as an Internet protocol-virtual private network (IP-VPN).

<1-3 Server 20>

As illustrated in FIG. 1, the server 20 is an apparatus including a knowledge database 22.

[1-3-1. Knowledge Database 22]

The knowledge database 22 is a database used for managing content in association with tag information generated by the information processing apparatus 10. In addition, the knowledge database 22 stores user profile information for each of users. The user profile information includes, for example, the age, gender, favorite genre, and a favorite word.

The knowledge database 22 further includes a mapping table that contains the emphasis level of each of words. The mapping table contains the emphasis level of each word in accordance with, for example, the meaning of the word. For example, the adverb "very" has a high emphasis level. In contrast, the adverb "reasonably" has a low emphasis level. In addition, since the adjective "beautiful" indicates a positive state of mind, the emphasis level is high in the mapping table. In contrast, since the adjective "dirty" indicates a negative state of mind, the emphasis level is low in the mapping table. However, determination of the emphasis level is not limited to the above-described example. The "high" and "low" levels as the emphasis level may be reversed.

The mapping table may further contain the emphasis level of a word for each of the users. For example, in the mapping table, the emphasis level of each word may be determined on the basis of the user profile information of each user. For example, if the user profile information indicates that a hobby of the user is mountain climbing, the emphasis level of the word "mountain" may be recorded in the knowledge database 22 so as to be high.

Note that in the knowledge database 22, data is managed in the triple form: 'subject'-'predicate'-'value'. For example, the knowledge database 22 manages data as follows: "baseball-semantic concept-sport", "John-family-Smith family", and "John-friend-Paul". Accordingly, the server 20 can extract a word related to a given word and the semantic concept of a given word from the knowledge database 22.

According to the present exemplary embodiment, the basic configuration of the information processing system is designed as described above. In the above-described information processing system, the information processing apparatus 10 according to the present exemplary embodiment can display a relationship between content and the tag information associated with the content so that the viewer can easily understand the relationship. The present exemplary embodiment is described in detail and step by step below.

<<2. Detailed Description Of Embodiments>>

<2-1. Configuration>

Figure 4:
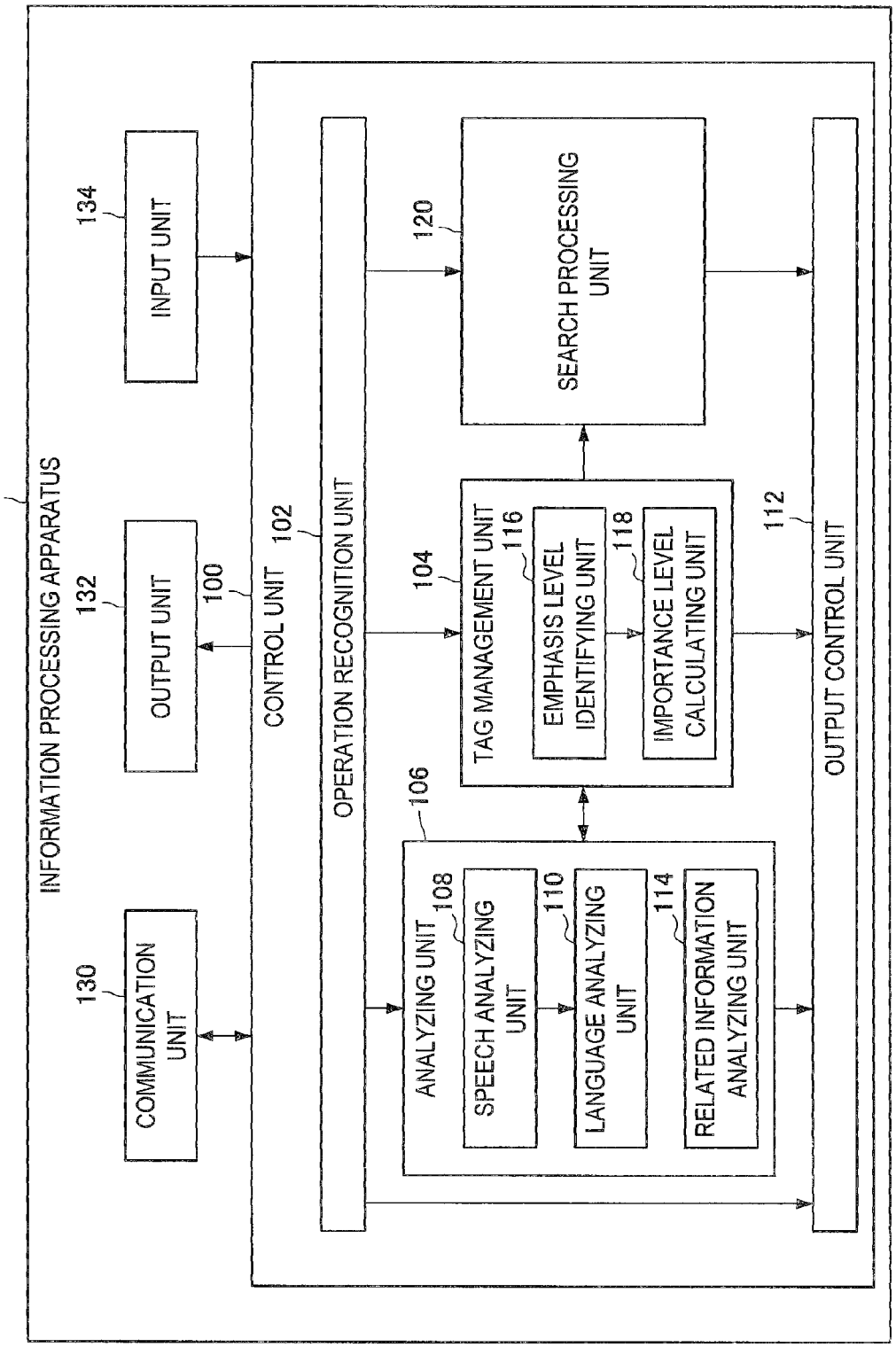
FIG. 4 is a functional block diagram illustrating the configuration of the information processing apparatus 10 according to the exemplary embodiment.

An exemplary configuration of the information processing apparatus 10 according to the present exemplary embodiment is described in detail below first. FIG. 4 is a functional block diagram illustrating the configuration of the information processing apparatus 10 according to the present exemplary embodiment. As illustrated in FIG. 4, the information processing apparatus 10 includes a control unit 100, a communication unit 130, an output unit 132, and an input unit 134.

[2-1-1. Control Unit 100]

The control unit 100 performs overall control of the operations of the information processing apparatus 10 using the hardware in the information processing apparatus 10, such as the CPU 150 and the RAM 154. In addition, as illustrated in FIG. 4, the control unit 100 includes an operation recognition unit 102, a tag management unit 104, an analyzing unit 106, an output control unit 112, and a search processing unit 120.

[2-1-2. Operation Recognition Unit 102]

The operation recognition unit 102 recognizes the operation performed on the display screen by a user and received by the input unit 134 (described below). For example, if the user touches the display screen, the operation recognition unit 102 recognizes that the user selects the position at which the user touches.

[2-1-3. Tag Management Unit 104]

The tag management unit 104 manages tag information, such as generating tag information in association with the content and deleting tag information. For example, the tag management unit 104 generates tag information on the basis of input information, such as user speech or text, input to the input unit 134 by the user and the tagged position specified by the user and recognized by the operation recognition unit 102. In addition, the tag management unit 104 instructs the communication unit 130 (described below) to send the generated tag information to the server 20. Thus, the content is stored in the knowledge database 22 in association with the tag information.

Furthermore, as illustrated in FIG. 4, the tag management unit 104 includes an emphasis level identifying unit 116 and an importance level calculating unit 118.

[2-1-4. Analyzing Unit 106]

The analyzing unit 106 analyzes the input information, such as user speech or text, input to the input unit 134 by the user and information contained in the content.

As illustrated in FIG. 4, the analyzing unit 106 includes a speech analyzing unit 108, a language analyzing unit 110, and a related information analyzing unit 114.

[2-1-5. Speech Analyzing Unit 108]

The speech analyzing unit 108 converts the user speech input to the input unit 134 into text data using, for example, a speech recognition technology.

[2-1-6. Language Analyzing Unit 110]

The language analyzing unit 110 identifies a plurality of words in the text data input to the input unit 134 or the text data converted by the speech analyzing unit 108.

Note that if the language of the text is Japanese or Chinese, the language analyzing unit 110 may perform morphological analysis on the text data input to the input unit 134 or text data converted by the speech analyzing unit 108 so as to identify a plurality of morphemes.

[2-1-7. Output Control Unit 112]

(2-1-7-1. Display Control of Tag Indication Sign)

The output control unit 112 displays a tag indication sign in content between the tagged position associated with the tag information and the indication position specified by the user in a superimposed manner over the content. The display control of a tag indication sign performed by the output control unit 112 is described in detail with reference to the following sections "Example 1 of Display Control" to "Example 6 of Display Control".

—Example 1 of Display Control—

For example, the output control unit 112 can display a tag indication sign that starts at the tagged position and points to the indication position in the content.

The above-described function is described in more detail with reference to FIGS. 2, 5, and 6. FIG. 2 illustrates an example of a tag indication sign displayed in a still image 30. Note that in FIG. 2, the tag information is associated with the still image 30 at the tagged position 300 indicated by "From", and the position indicated by "To" is specified by the user as the indication position 302.

As illustrated in FIG. 2, the output control unit 112 displays a tag indication sign 304 in the form of, for example, a triangle or an arrow that starts at the tagged position 300 and points to the indication position 302 in a superimposed manner over the still image 30.

According to the display example 1, the viewer of the content can be easily aware that the message "Thank you" contained in the tag information is sent from a person corresponding to a human image located at the tagged position 300 to a person corresponding to a human image located at the indication position 302. That is, the viewer of the content can easily see from who and to whom the input information input by a user is sent.

Figure 5:
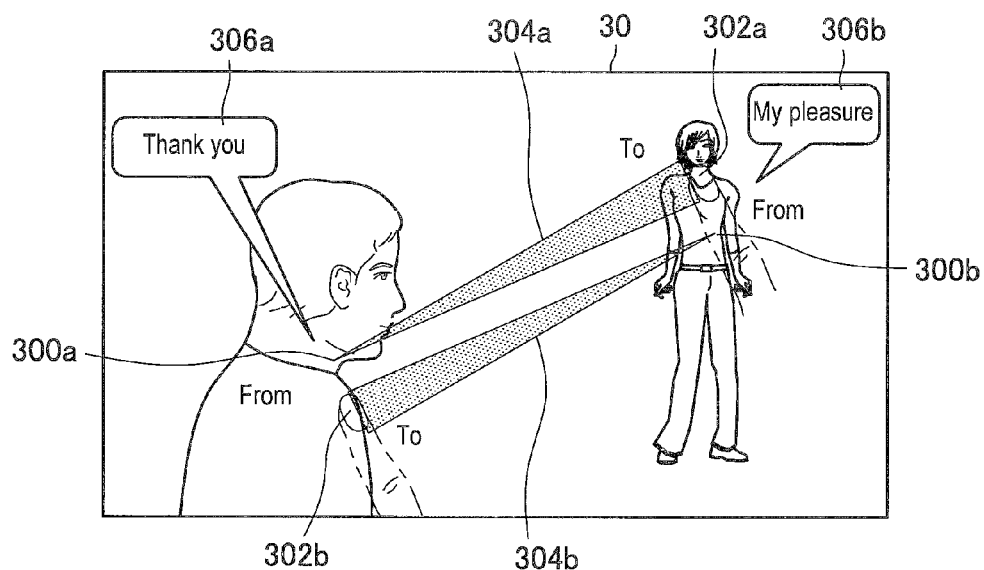
FIG. 5 illustrates an example of displaying a plurality of tag indication signs on a still image according to the exemplary embodiment.

FIG. 5 illustrates an example of displaying a plurality of tag indication signs in the still image 30. As illustrated in FIG. 5, when an indication position 302a is specified through a touch operation performed by a user, the output control unit 112 displays a tag indication sign 304a in the still image 30 between a tagged position 300a and an indication position 302a in a superimposed manner over the still image 30. In addition, if an indication position 302b is specified through a touch operation performed by another user, the output control unit 112 displays a tag indication sign 304b in the still image 30 between a tagged position 300b and an indication position 302b in a superimposed manner over the still image 30.

According to this example of displaying a plurality of tag indication signs, exchange of messages between a person corresponding to a human image located at the tagged position 300a and a person corresponding to a human image located at the tagged position 300b can be expressed in the content.

Note that the output control unit 112 can change the display format of the tag indicator sign, such as a color of the tag indication sign, in accordance with a user who tags the tag information. For example, in the example illustrated in FIG. 5, if the user who associates the tag information with the tagged position 300a differs from the user who associates the tag information with the tagged position 300b, the output control unit 112 may display the tag indication sign 304a and the tag indication sign 304b in different colors.

Figure 6:
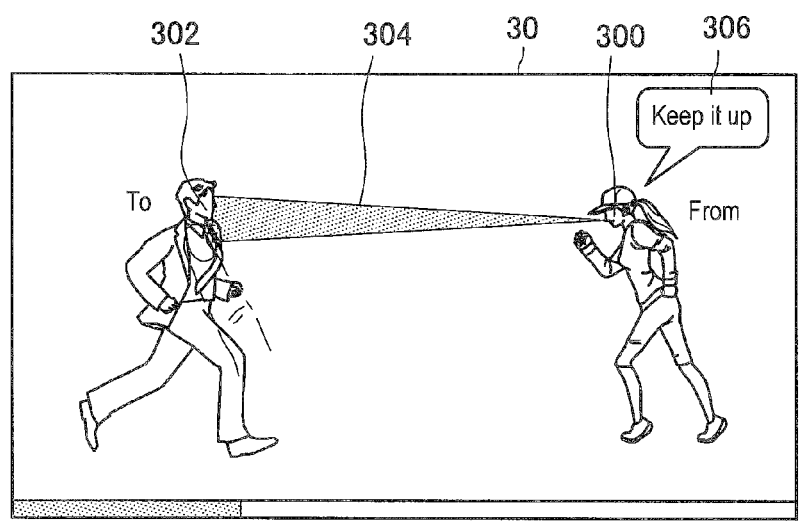
FIG. 6 illustrates an example of displaying a tag indication sign on a moving image according to the exemplary embodiment.

FIG. 6 illustrates an example of displaying a tag indication sign in a frame image 30 that constitutes a moving image. Note that in FIG. 6, tag information is associated with the tagged position 300 in the frame image 30 by the user when the moving image is paused. In addition, the indication position 302 is specified within the same frame image 30 by the user.

Like the example illustrated in FIG. 2, as illustrated in FIG. 6, when the indication position 302 is specified by the user, the output control unit 112 displays the tag indication sign 304 that starts at the tagged position 300 and points to the indication position 302 in the frame image 30 in a superimposed manner.

—Example 2 of Display Control—

In addition, when the content is a moving image, the output control unit 112 can display the tag indication sign 304 at the same position in both a frame image associated with the tag information (hereinafter referred to as a "tagged frame image") and a frame image subsequent to the frame image and having the indication position specified by the user (hereinafter also referred to as an "indication position set frame image"). Note that a tagged frame image is an example of a first frame image according to the present disclosure, and an indication position set frame image is an example of a second frame image according to the present disclosure.

More specifically, in each of the frame images from the tagged frame image to the indication position set frame image, the output control unit 112 can display the tag indication sign 304 between a position that is the same as the tagged position of the tagged frame image and a position that is the same as the indication position of the indication position set frame image.

Figure 7:
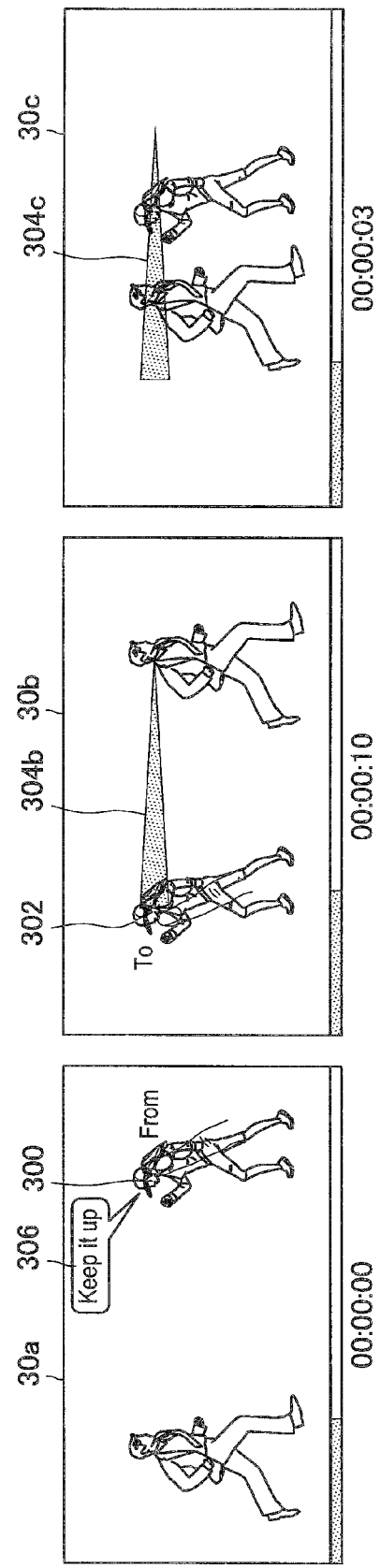
FIG. 7 illustrates an example of displaying a tag indication sign on a moving image according to the exemplary embodiment.

The above-described function is described in more detail below with reference to FIG. 7. FIG. 7 illustrates another example of displaying a tag indication sign in a moving image. In the example illustrated in FIG. 7, a frame image 30a, a frame image 30b, and a frame image 30c represent frame image of the same moving image at [00:00:00], [00:00:10], and [00:00:03], respectively. In addition, in FIG. 7, the frame image 30a is a frame image associated with the tag information at the tagged position 300 (a tagged frame image), and the frame image 30b is a frame image having the indication position 302 specified by the user (an indication position set frame image).

As illustrated in FIG. 7, in the frame image 30c, that is, a frame image located between the frame image 30a and the frame image 30b, the output control unit 112 displays the tag indication sign 304 between a position that is the same as the tagged position 300 in the frame image 30a and a position that is the same as the indication position 302 in the frame image 30b.

According to the display example, since the tag indication sign 304 is displayed at a fixed position in frame images from the tagged frame image to the indication position set frame image, the viewer of the moving image can easily understand a relationship of indication from the object located in the tagged frame image to the object located at the indication position set frame image.

—Example 3 of Display Control—

In addition, when the content is a moving image and if the related information analyzing unit 114 (described below) recognizes an object located at the tagged position (hereinafter also referred to as a "tagged object") and an object located at the indication position ((hereinafter also referred to as an "indicated object"), the output control unit 112 can change the position or the length of the displayed tag indication sign in accordance with movement of the tagged object or the indicated object in the content.

Figure 8:
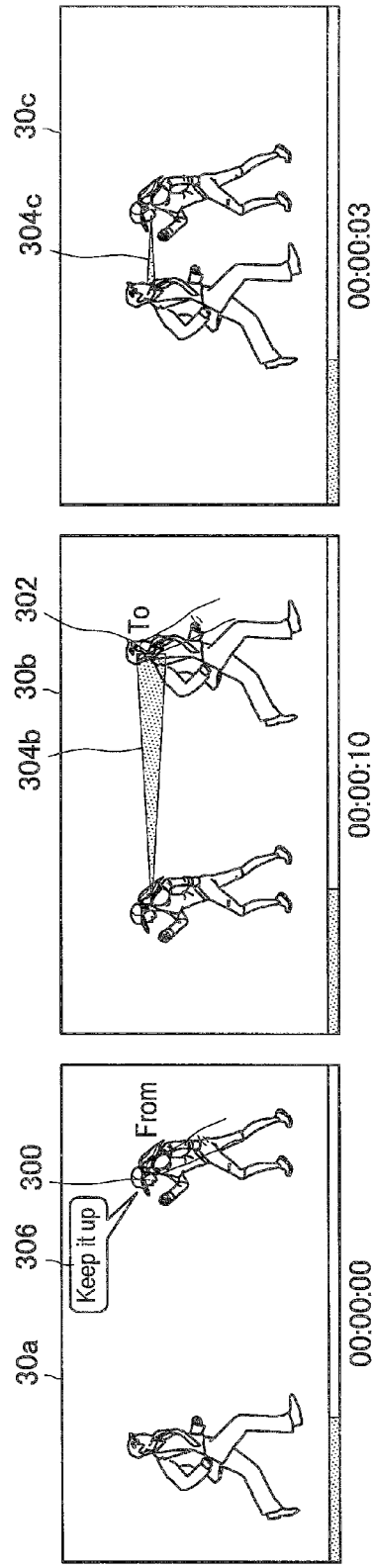
FIG. 8 illustrates an example of displaying a tag indication sign on a moving image according to the exemplary embodiment.

The above-described function is described in more detail below with reference to FIG. 8. FIG. 8 illustrates another example of displaying a tag indication sign in a moving image. As in FIG. 7, in FIG. 8, a frame image 30a, a frame image 30b, and a frame image 30c represent frame image of the same moving image at [00:00:00], [00:00:10], and [00:00:03], respectively. In addition, in FIG. 8, the frame image 30a is a tagged frame image, and a human image located at the tagged position 300 is already recognized by the related information analyzing unit 114. Furthermore, the frame image 30b is an indication position set frame image, and a human image located at the indication position 302 is already recognized by the related information analyzing unit 114.

As illustrated in FIG. 8, in the frame image 30c located between the frame image 30a and the frame image 30b, the output control unit 112 displays the tag indication sign extending from the tagged object to the indicated object.

According to the display example, since the position at which the tag indication sign is displayed and the length of the displayed tag indication sign is changed while following the position of the tagged object or the indicated object that is moving, the viewer of the content can easily understand a relationship of indication between the tagged object and the indicated object.

—Example 4 of Display Control—

In addition, in content that displays a plurality of still images in conjunction with one another, the output control unit 112 can display the tag indication sign 304 in the still image associated with the tag information (hereinafter also referred to as a "tagged image") and the still image having an indication position specified by a user (hereinafter also referred to as an "indication position set image").

Figure 9:
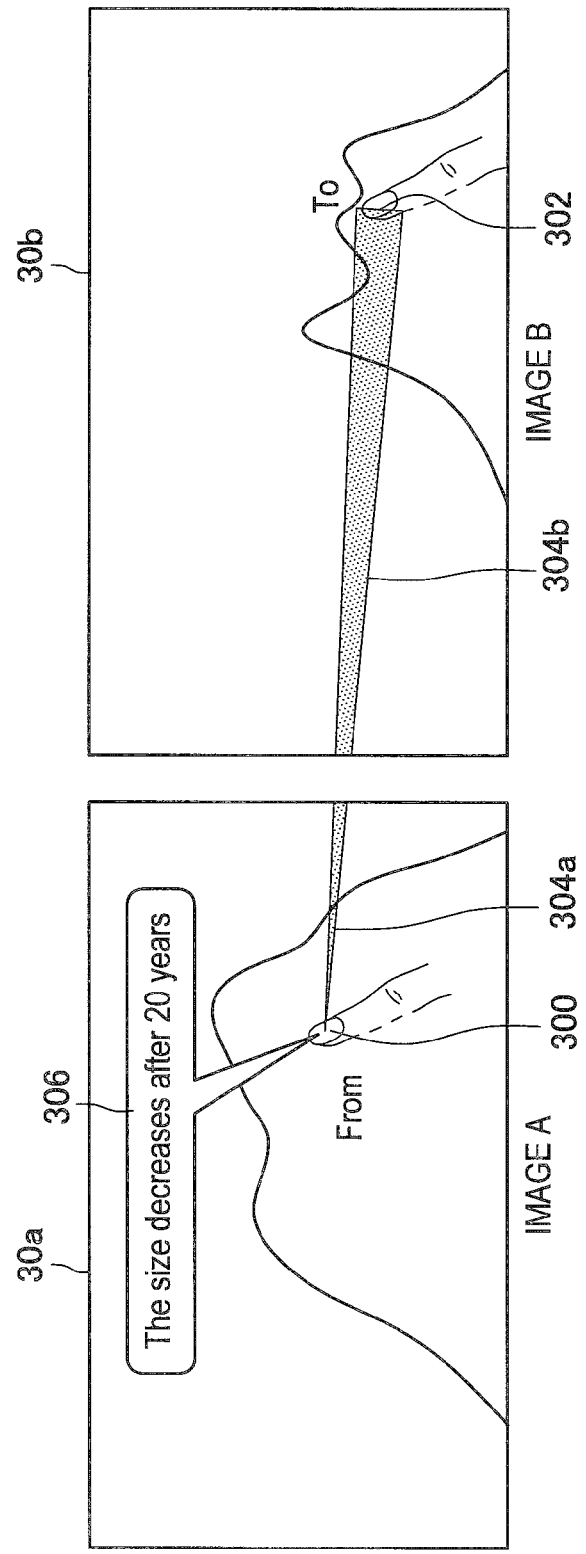
FIG. 9 illustrates an example of displaying a tag indication sign in two still images according to the exemplary embodiment.

The above-described function is described in more detail below with reference to FIG. 9. FIG. 9 illustrates an example of displaying a tag indication sign in content that displays two still images arranged in the horizontal direction. In the example illustrated in FIG. 9, the frame image 30a is a still image associated with the tag information at the tagged position 300 (a tagged image), and the frame image 30b is a still image having the indication position 302 set by the user (an indication position set image).

As illustrated in FIG. 9, the output control unit 112 displays the tag indication sign 304 between the tagged position 300 in the frame image 30a and the indication position 302 in the frame image 30b. More specifically, the output control unit 112 displays a partial image 304a of the tag indication sign inside the frame image 30a and displays the remaining image 304b of the tag indication sign inside the frame image 30b.

According to such a display example, the viewer of the content can easily understand that the message "The size decreases after 20 years." contained in the tag information of the frame image 30a is pointed at an image of a mountain displayed in the frame image 30b, that is, an indication relationship between the tag information associated with the tagged image and the indication position in the indication position set image.

—Example 5 of Display Control—

In addition, if the operation recognition unit 102 recognizes an operation to change the shape of the tag indication sign, the output control unit 112 can change the tag indication sign to a shape in accordance with the recognized instruction from the user.

Figure 10:
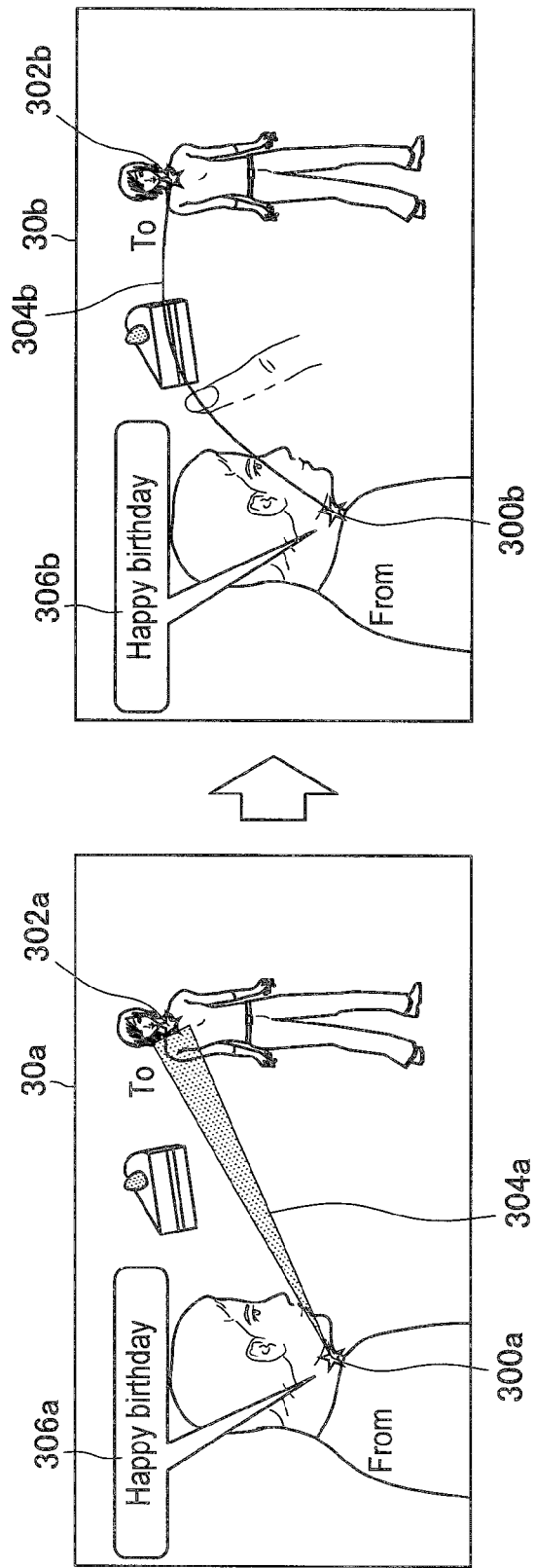
FIG. 10 illustrates an example of changing the shape of a tag indication sign and displaying the tag indication sign according to the exemplary embodiment.

The above-described function is described in more detail below with reference to FIG. 10. FIG. 10 illustrates an example of changing the shape of a tag indication sign and displaying the tag indication sign. Note that the left section of FIG. 10 illustrates the partial image 304a of the tag indication sign displayed when the indication position 302a is specified in the content 30 by the user, and the right section of FIG. 10 illustrates the partial image 304a of the tag indication sign having a shape changed from that in the left section in response to the operation performed by the user.

As illustrated in FIG. 10, the output control unit 112 changes the shape of the tag indication sign 304 from a tag indication sign 304a to a tag indication sign 304b in response to, for example, the touch operation performed on the display screen by the user (the user instruction).

According to such a display example, by changing the shape of the tag indication sign 304 so that the tag indication sign 304 overlaps the "image of a cake" in FIG. 10, the user can more emphasize the message "Happy birthday" contained in the tag information and send the message to the viewer of the content.

—Example 6 of Display Control—

In addition, the output control unit 112 can dynamically change the display format of the tag indication sign (e.g., change the format from the tagged position to the indication position) in accordance with the output of the input information contained in the tag information. For example, the output control unit 112 displays the tag indication sign in a display format varying with the elapsed time of the output of the input speech on the basis of the distance from the tagged position to the indication position and the recording time of the input speech.

Figure 11:
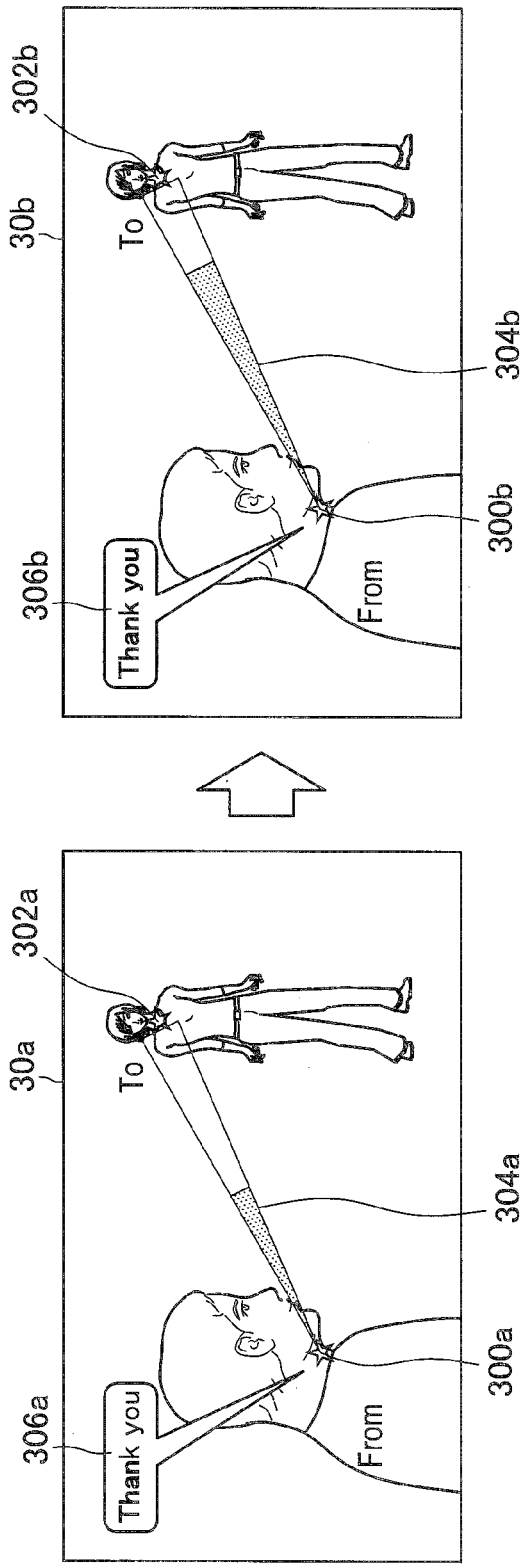
FIG. 11 illustrates an example of a dynamic change in the displayed tag indication sign over time according to the exemplary embodiment.

The above-described function is described in more detail below with reference to FIG. 11. FIG. 11 illustrates an example of a change in display format of the tag indication sign over time, during which the input information input by the user and contained in the tag information is being output. Note that the left section of FIG. 11 illustrates an example of the tag indication sign displayed at a time when "Than" of the input speech "Thank you" has been output, and the right section of FIG. 11 illustrates an example of the tag indication sign displayed at a time when "Thank" of the input speech "Thank you" has been output.

As indicated by an area with hatchings in FIG. 11, the output control unit 112 displays the tag indication sign 304 (from the partial image 304a to the remaining image 304b) in accordance with the output of the input speech, that is, by gradually increasing the ratio of the length of a displayed area to the total length (i.e., the length from the tagged position 300 to the specified position 302).

According to such a display example, when the input information is being output, the viewer of the content can be aware of the progress of the output of the input information and the total output time.

(2-1-7-2. Output Control of Input Information Input by User)

In addition, the output control unit 112 outputs the input information input by a user and contained in the tag information associated with the content. Particular examples of output control of the input information are described below in the sections "Example 1 of Output Control" to "Example 4 of Output Control".

—Example 1 of Output Control—

For example, when the tag information is selected by the user during reproduction of the content, the output control unit 112 can output the input information input by the user and contained in the selected tag information.

In the example illustrated in FIG. 5, if the tag information associated with the tagged position 300a is selected by the user, the output control unit 112 outputs the input speech "Thank you" contained in the selected tag information. In contrast, if the tag information associated with the tagged position 300*b* is selected by the user, the output control unit 112 outputs the input speech "My pleasure" contained in the selected tag information.

—Modification 1—

Note that if the input information input from the user is user speech (not text data), the output control unit 112 may directly output the user speech obtained when the tag information is associated or the latest user speech stored in the knowledge database 22, for example. Alternatively, the output control unit 112 may output the input information input by the user using audio data, such as the voice of an actor or sound effects, stored in the knowledge database 22.

—Modification 2—

In addition, by querying the server 20 for the age of a user who reproduces the tag information, the output control unit 112 can change the reading aloud speed of the input speech (the output speed) in accordance with the age of the user. For example, if the age of the user is higher than a predetermined age, the output control unit 112 decreases the speed of the reading aloud speed of the input speech. Alternatively, the output control unit 112 can output the input speech at a speed set by a user who reproduces the tag information.

—Modification 3—

In addition, as illustrated in FIG. 5, the output control unit 112 can display an input information display message 306 in the form of, for example, a words balloon including text converted from the input speech of the user by the speech analyzing unit 108. Note that as a modification, the output control unit 112 may display the input information display message 306 without outputting the speech input by the user.

—Example 2 of Output Control—

In addition, the output control unit 112 can output the input information input by the user and contained in each of a plurality of pieces of tag information in the order of time at which the tag information is associated with the content.

Figure 12:
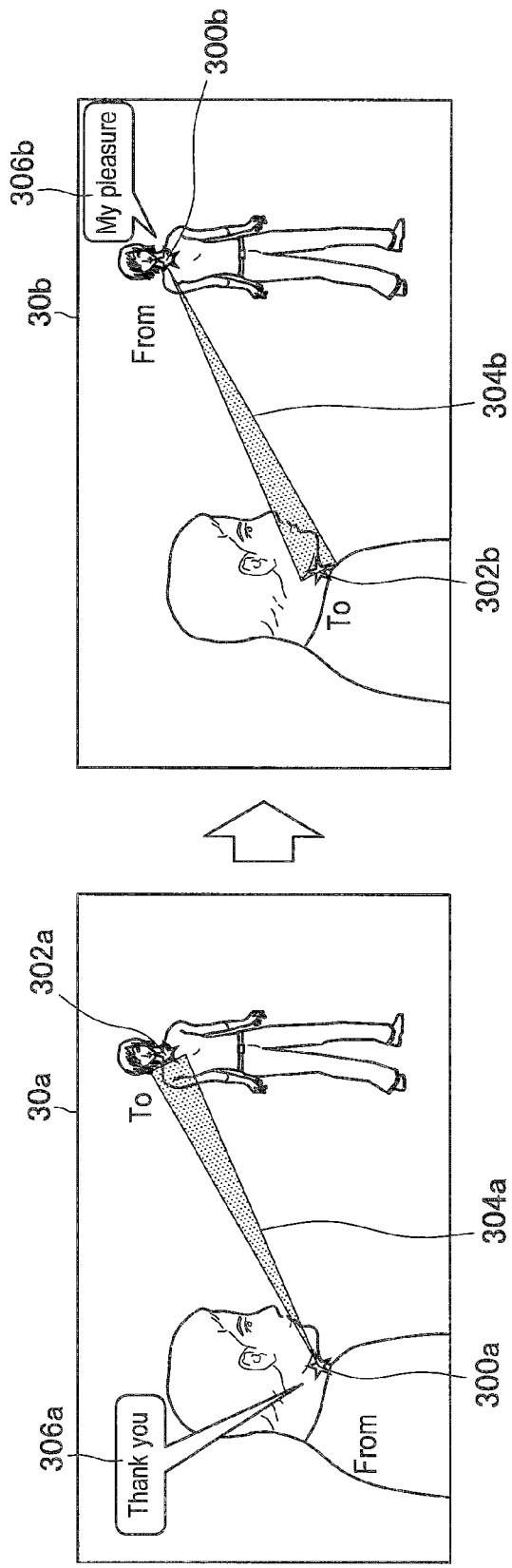
FIG. 12 illustrates an example of displaying a plurality of tag indication signs according to the exemplary embodiment.

The above-described function is described in more detail below with reference to FIG. 12. FIG. 12 illustrates an example of outputting the input information input by the user when a plurality of pieces of the tag information are associated with the content 30. Note that in FIG. 12, the time at which the tag information is associated with the tagged position 300*a* in the left section is earlier than the time at which the tag information is associated with the tagged position 300*b* in the right section.

As illustrated in FIG. 12, the output control unit 112 outputs the input speech contained in the tag information associated with the tagged position 300*a* having a timestamp representing the time at which the tag information is associated with the tagged position 300*a* first. Thereafter, the output control unit 112 outputs the input speech contained in the tag information associated with the tagged position 300*b*.

Note that as illustrated in FIG. 12, the output control unit 112 can display the tag indication sign 304 in output order of the input speech of the user contained in the tag information in a slide show fashion. That is, after the partial image 304*a* is displayed, the remaining image 304*b* is displayed.

—Example 3 of Output Control—

In addition, the output control unit 112 can extract the tag information having a level of importance that is higher than a predetermined threshold value calculated by the importance level calculating unit 118 (described below) and output the input information input by the user and contained in the extracted tag information.

Figure 13:
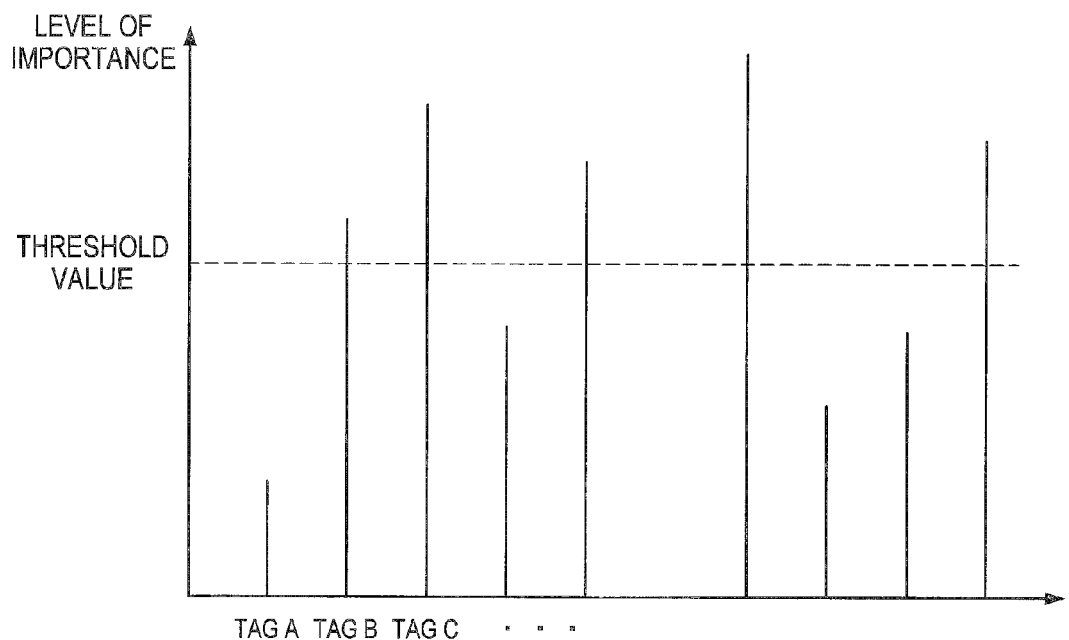
FIG. 13 is a graph indicating an example of the level of importance calculated for each of tags according to the exemplary embodiment.

The above-described function is described in more detail below with reference to FIG. 13. FIG. 13 is a graph indicating, when a plurality of pieces of tag information are associated with content, the level of importance of each piece of the tag information calculated by the importance level calculating unit 118.

As illustrated in FIG. 13, for example, the output control unit 112 extracts a "tag B" and a "tag C" each having a calculated level of importance that is higher than the threshold value. Thereafter, the output control unit 112 outputs the input information input by the user and contained in the extracted tag information.

In the example of outputting input information, if, for example, a plurality of pieces of tag information are associated with the content, the viewer of the content can view or listen to only the pieces of tag information having a high level of importance among the plurality of pieces of tag information in a short time.

—Modification—

Note that, as a modification, if the content is a moving image and the total time after editing is specified by the user, the output control unit 112 can automatically set the threshold value so that the reproducing time of the content corresponding to the pieces of tag information extracted from all the pieces of tag information associated with the content matches the time specified by the user.

In such a case, if parts of content corresponding to the extracted pieces of tag information are connected to each other and the content is reproduced, the viewer may feel dissatisfied with discontinuity occurring at the boundary between the parts. Accordingly, to remove the dissatisfaction of the viewer, the output control unit 112 can cut out the parts of the content (part of the content corresponding to the extracted tag information) on the basis of, for example, the image information, audio information, and camera information contained in the content so that a change occurring at the boundary is minimized.

—Example 4 of Output Control—

In addition, the output control unit 112 can display a plurality of words identified by the language analyzing unit 110 from the input information input by the user and contained in the tag information so that the words are superimposed on the content in a display format corresponding to the emphasis level of each word identified by the emphasis level identifying unit 116.

Figure 14:
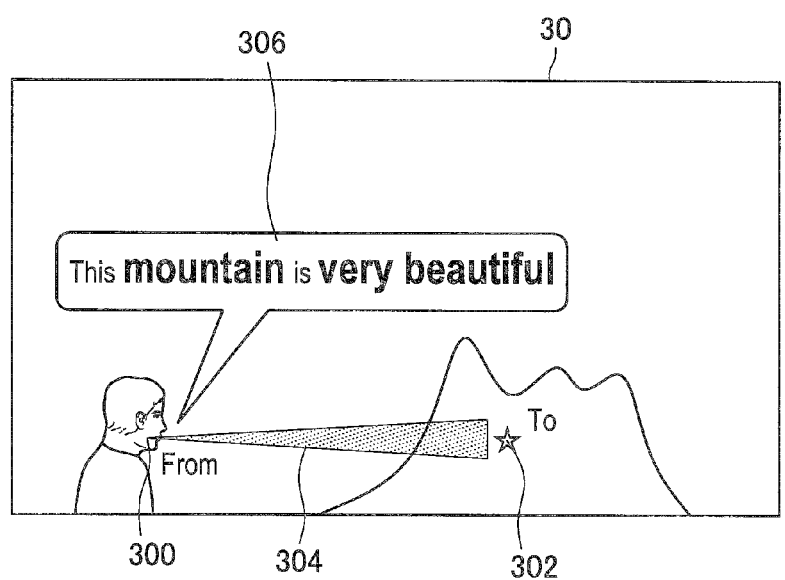
FIG. 14 illustrates an example of emphasizing and displaying input information input by the user according to the exemplary embodiment.

The above-described function is described in more detail below with reference to FIG. 14. FIG. 14 illustrates an example of emphasizing and displaying the plurality of words identified from the user speech by the language analyzing unit 110. As illustrated in FIG. 14, for example, the output control unit 112 displays the identified words so that the word having a higher emphasis level identified by the emphasis level identifying unit 116 has a larger font size, that is, the font size of the words "mountain" and "beautiful" is larger than the font size of word "this".

According to the display example, for example, a word that the user who performed the tagging operation is interested in or a word having positive meaning is more emphasized and displayed. Accordingly, the viewer of the content can be easily aware of the interest of the user who performed the tagging operation and the excitation that the user experienced when the user performed the tagging operation.

Note that as a modification, the output control unit 112 can emphasize the word (or a character) identified by the language analyzing unit 110 from the input user speech by following the audio level of the input user speech contained in the tag information. More specifically, by using the volume or the frequency level of audio data identified by the speech analyzing unit 108 from the speech input by the user and contained in the tag information and a plurality of words identified by the language analyzing unit 110, the output control unit 112 can map the volume or the frequency level of the audio data to a word (or a character). Thereafter, the output control unit 112 can emphasize the word and display the word (or the character) on the basis of the mapping.

According to the modification, by changing, for example, the vocal intensity or voice pitch for part that the user really wants to say or wants to record, the user can apply an effect to the word (or the character). For example, when the user utters "This mountain is beautiful" and if the user loudly utters the words "mountain" and "beautiful", the font of the text "mountain" and "beautiful" displayed on the content can be larger than the font of the other text, or the color of the font of the text "mountain" and "beautiful" displayed on the content can be changed from that of the other text. Alternatively, an animation effect, such as swinging, can be applied to the text "mountain" and "beautiful". In addition, if, for example, the user is impressed or surprised and, thus, utters the word "Wow!", the information processing apparatus 10 can more emphasize the word by detecting the audio level of the speech. Accordingly, the information output from the user can be expressed more naturally, and the excitement that the user experienced can be more clearly expressed.

(2-1-7-3. Control of Displaying Tagged Position And Indication Position)

In addition, the output control unit 112 can further display signs representing the tagged position and the indication position in a manner that the signs are superimposed on the content. Furthermore, the output control unit 112 can display signs representing the tagged position and the indication position in different formats. For example, the output control unit 112 displays, as illustrated in FIG. 10, the sign representing the tagged position in a star shape and the sign representing the indication position in a circular shape. In this manner, the signs are displayed in different shapes. Alternatively, the output control unit 112 displays the sign representing the tagged position in red and displays the sign representing the indication position in blue. In this manner, the signs are displayed in different colors.

According to the display example, the sign representing the tagged position and the sign representing the indication position are displayed in different display formats. Accordingly, the viewer of the content can tell the tagged position from the indication position more easily. In particular, this technique is effective when as illustrated in FIG. 5, the input information display message 306 is not displayed.

(2-1-7-4. Control of Displaying Related Information)

In addition, the output control unit 112 can display the related information identified by the related information analyzing unit 114 (described below) in a superimposed manner over the content. For example, the output control unit 112 displays the information that is related to the objects located at the tagged position and the indication position and that is identified by the related information analyzing unit 114 in a manner that the information is superimposed over the content. Note that the information is obtained when the tag information is associated with the content.

Figure 15:
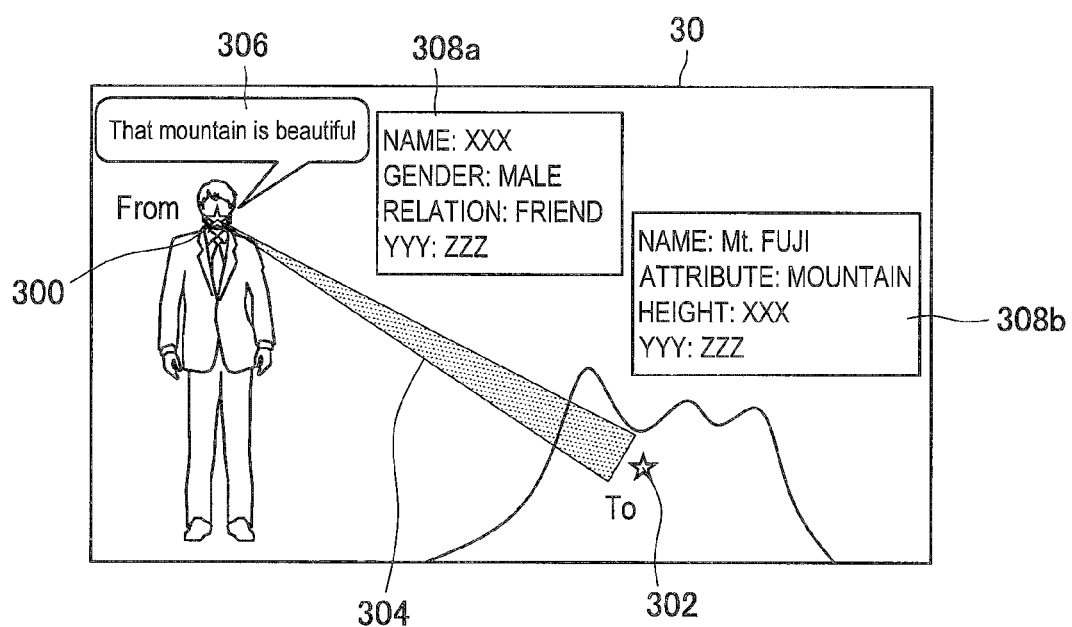
FIG. 15 illustrates an example of displaying related information according to the exemplary embodiment.

The above-described function is described in more detail below with reference to FIG. 15. FIG. 15 illustrates an example of displaying the related information after the tag information is associated with the content 30.

As illustrated in FIG. 15, for example, the output control unit 112 displays a related information display field 308a in the content. For example, information regarding a human image located at the tagged position 300 obtained when the tag information is associated with the content is displayed in the related information display field 308a. Examples of the related information is the name of the human image and the relationship between the human image and the user who performed the tagging operation. In addition, the output control unit 112 displays, in the content, a related information display field 308b including information regarding the mountain image located at the specified position 302, such as the name of the mountain and the height of the mountain.

Note that the output control unit 112 can display a related information display field 308 so that the related information display field 308 does not interfere with the information of the content. For example, as illustrated in FIG. 15, the output control unit 112 displays the related information display field 308 in the content so that the related information display field 308 does not overlap the face region of the human image and the displayed text.

—Modification—

In addition, the output control unit 112 may display information related to the content when the input information contained in the tag information is output. Alternatively, the output control unit 112 may display information related to the content when the user associates the tag information with the content. In the latter case, the output control unit 112 can display the information related to the content at, for example, a position of the display screen at which the user touches. According to the display example, by displaying, for example, the related information regarding a human image contained in the content, the user can identify a person corresponding to the human image and associate the tag information with a desired position.

(2-1-7-5. Control of Displaying Search Result)

In addition, if the tag information associated with the content is searched for by the search processing unit 120 (described below), the output control unit 112 can display the search result in the display screen. For example, the output control unit 112 displays, in the display screen, a plurality of pieces of the tag information extracted by the search processing unit 120 in the time order in which the pieces of tag information are associated with the content. Alternatively, the output control unit 112 displays, in the display screen, a plurality of pieces of tag information extracted by the search processing unit 120 in the descending order of importance calculated by the importance level calculating unit 118.

[2-1-8. Related Information Analyzing Unit 114]

The related information analyzing unit 114 is an example of an image recognition unit of the present disclosure. The related information analyzing unit 114 analyzes the vicinity of a given position of the content, such as the tagged position or the indication position, to obtain related information. For example, by analyzing the vicinity of the tagged position (or the indication position), the related information analyzing unit 114 can recognize the tagged object (or the indicated object).

In addition, by sending a query to the server 20 on the basis of the result of analysis of the vicinity of a given position of the content, the related information analyzing unit 114 can obtain the related information at the given position. For example, in the example illustrated in FIG. 15, the related information analyzing unit 114 identifies a human image located at the tagged position 300 and sends a query containing the result of identification to the server 20. Thus, the related information analyzing unit 114 obtains, from the server 20, related information illustrated in the related information display field 308a.

[2-1-9. Emphasis Level Identifying Unit 116]

By sending to, for example, the server 20, a query regarding each of a plurality of words that are identified from the user input information by the language analyzing unit 110 and that are contained in the tag information, the emphasis level identifying unit 116 identifies the emphasis level of the word.

[2-1-10. Importance Level Calculating Unit 118]

The importance level calculating unit 118 calculates the level of importance of the tag information associated with the content. More specifically, the importance level calculating unit 118 can calculate the level of importance of the tag information on the basis of the emphasis level of each of the words identified from the input information input by the user and contained in the tag information by the emphasis level identifying unit 116. For example, the importance level calculating unit 118 calculates the level of importance of the tag information on the basis of a modifier-modified word relationship among the words (e.g., an adverb modifies an adjective). For example, if the text "This mountain is very beautiful" is obtained after the language analyzing unit 110 converts the input user speech to text data, the adverb "very" modifies the adjective "beautiful". Accordingly, by multiplying the emphasis level of the word "beautiful" by the emphasis level of the word "very", the importance level calculating unit 118 calculates the level of importance of the tag information.

[2-1-11. Search Processing Unit 120]

The search processing unit 120 searches for a plurality of pieces of tag information associated with the content on the basis of, for example, a user search instruction recognized by the operation recognition unit 102.

In addition, by sending, for example, the user ID of the user who is searched for to the server 20, the search processing unit 120 can identify a preference of the user from the user profile information recorded in the knowledge database 22 and search for a piece of the tag information using the result of identification. For example, if the search processing unit 120 identifies that the user likes "mountains" from the user profile information, only a piece of the tag information containing the input information having the word "mountain" therein is extracted, or a piece of the tag information is extracted so that a piece of tag information containing the input information having a word related to a "mountain" therein is listed at the top of the search result and is displayed.

Note that as described above, the data in the knowledge database 22 are managed in the triple form. Accordingly, the search processing unit 120 can search for a piece of tag information using semantic concept or a related genre (e.g., a family, a friend, or a sport). For example, if the user selects, as a search key, a piece of tag information containing input information having the word "baseball" therein, the search processing unit 120 can extract a piece of tag information containing input information having a word related to a sport (which is a genre related to "baseball"). In addition, if the user selects, as a search key, a piece of tag information containing the input information having the name of a person therein, the search processing unit 120 can extract a piece of tag information containing the name of the family of the person or the name of a friend of the person.

[2-1-12. Communication Unit 130]

The communication unit 130 receives and sends information from and to a variety of apparatuses connected to the communication network 12 via the communication network 12. For example, the communication unit 130 is controlled by the related information analyzing unit 114, the emphasis level identifying unit 116, and the importance level calculating unit 118 to send the positional information, such as the tagged position and the indication position, to the server 20. In addition, the communication unit 130 receives, from the server 20, the related information and the emphasis level of a word, for example.

[2-1-13. Output Unit 132]

The output unit 132 displays the content and the tag indication sign in the display screen under the control of the output control unit 112. In addition, the output unit 132 outputs the input speech of the user contained in the tag information.

[2-1-14 Input Unit 134]

The input unit 134 receives a variety of input operations performed on the information processing apparatus 10 by the user. For example, the input unit 134 receives position information determined through a touch operation performed in order to specify the indication position in the content.

It should be noted that the configuration of the information processing apparatus 10 according to the present exemplary embodiment is not limited to the above-described configuration. For example, at least one of the related information analyzing unit 114, the emphasis level identifying unit 116, the importance level calculating unit 118, the search processing unit 120, the communication unit 130, the output unit 132, and the input unit 134 may be removed from the information processing apparatus 10.

<2-2. Operations>

The configuration according to the present exemplary embodiment has been described above. The operations according to the present exemplary embodiment are described next in sections "2-2-1 Operation to Associate Tag Information and Reproducing Operation" and "2-2-2 Search Operation of Tag Information". In the following description, user speech is input as the input information.

[2-2-1. Operation to Associate Tag Information and Reproducing Operation]

Figure 16:
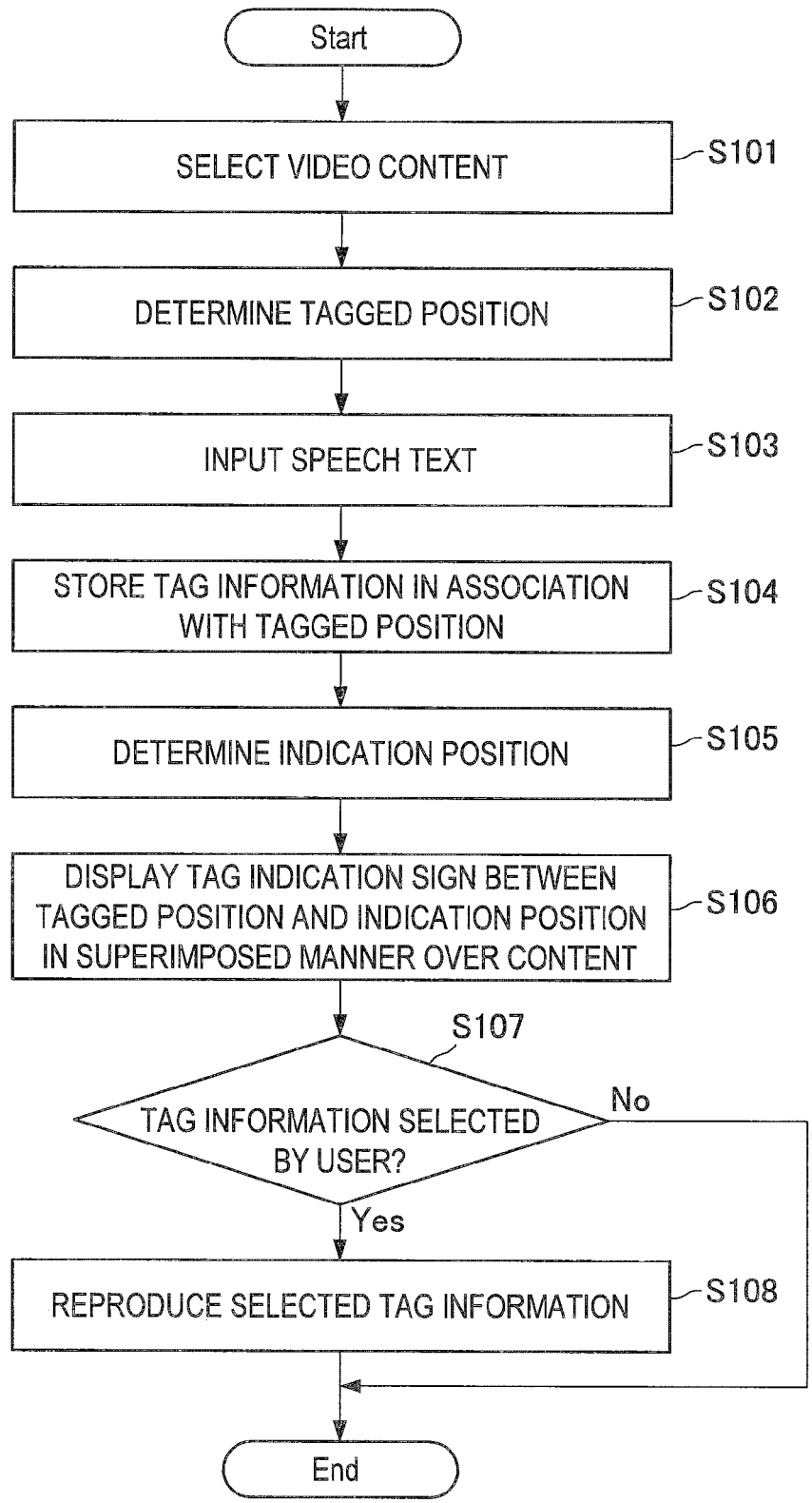
FIG. 16 is a flowchart of part of the operation according to the present exemplary embodiment.

FIG. 16 is a flowchart of the operation to associate tag information and the reproducing operation of the tag information according to the present exemplary embodiment. As illustrated in FIG. 16, the user selects desired content with which tag information is to be associated in, for example, a content selection screen displayed on the output apparatus 162 first. Thereafter, the output control unit 112 of the information processing apparatus 10 displays the selected content in the display screen (S101).

Subsequently, the user specifies the tagged position in the content displayed in the display screen (S102). Thereafter, the user inputs speech thereof to the input unit 134 (S103).

Subsequently, the tag management unit 104 generates tag information including the position information regarding the tagged position specified in step S102 and the speech input in step S103. Thereafter, the tag management unit 104 instructs the communication unit 130 to send, to the server 20, the generated tag information and ID information regarding the content selected in step S101. The server 20 stores the tag information received from the information processing apparatus 10 in the knowledge database 22 in association with the content selected in step S101 (S104).

Subsequently, the user specifies the indication position in the content (for the tag information generated in step S104) through, for example, a touch operation performed on the display screen (S105).

Subsequently, the output control unit 112 displays a tag indication sign between the tagged position and the indication position in a superimposed manner over the content (S106).

Subsequently, the operation recognition unit 102 determines whether a selection operation to reproduce one of a plurality pieces of the tag information associated with the content is performed (S107).

If an operation to select any one of the pieces of tag information is recognized (YES in step S107), the output control unit 112 outputs the speech input by the user and contained in the selected tag information (S108).

(2-2-1-1. Modification)

Note that the order in which the processes in steps S102 to S105 are performed is not limited to the above-described order. The order of the steps may be appropriately changed.

[2-2-2 Search Operation of Tag Information]

Figure 17:
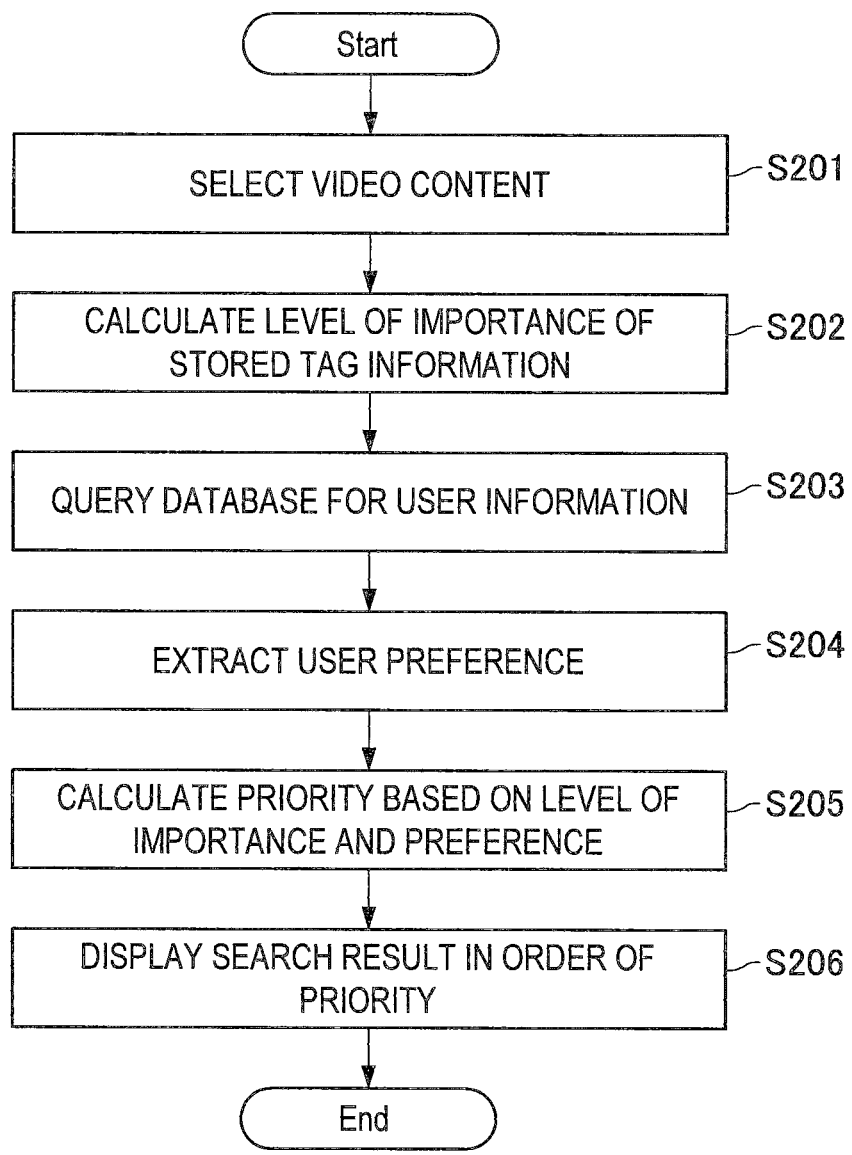
FIG. 17 is a flowchart of part of the operation according to the present exemplary embodiment.

The search operation of tag information is described next. FIG. 17 is a flowchart of the search operation of tag information according to the present exemplary embodiment. As illustrated in FIG. 17, the user selects desired content in the content selection screen displayed on, for example, the output apparatus 162 in order to search for the tag information regarding the content. Thereafter, the output control unit 112 of the information processing apparatus 10 displays the selected content in the display screen (S201).

Subsequently, for example, the search processing unit 120 sends the query to the server 20. Thus, the search processing unit 120 searches for a plurality of pieces of tag information associated with the content selected in step S201. Thereafter, the importance level calculating unit 118 calculates the level of importance of each of the pieces of tag information (S202).

Subsequently, for example, the search processing unit 120 instructs the communication unit 130 to send the user ID of a user (a target of the search) to the server 20. Thus, the search processing unit 120 queries the server 20 for the user preference information (S203).

Thereafter, the communication unit 130 receives the user preference information from the server 20 (S204).

Subsequently, the importance level calculating unit 118 calculates the display priority of each of the plurality of received pieces of tag information on the basis of the level of importance calculated in step S202 and the user preference information received in step S204 (S205).

Subsequently, the output control unit 112 displays the received pieces of tag information in the display screen in the display order calculated in step S205 (S206).

[2-3. Effects]

(2-3-1. Effect 1)

As described above with reference to, for example, FIGS. 2, 4, and 16, the information processing apparatus 10 according to the present exemplary embodiment displays the tag indication sign between the tagged position and the indication position in a superimposed manner over content. Accordingly, the information processing apparatus 10 can display the tag indication sign so that the viewer of the content can easily understand the relationship between the content and the tag information associated with the content.

For example, the information processing apparatus 10 displays a tag indication sign starting at the tagged position (a starting point) and pointing to the indication position in a superimposed manner over the content. Accordingly, the viewer of the content can clearly and easily understand from who and to whom the input information, such as speech or text, input by a user and contained in the tag information is sent.

In addition, upon being aware that the tag information is a message sent from another person to himself/herself, the viewer of the content can associate additional tag information, which serves as a reply to the message, with the content. In this manner, the viewer can communicate with the person. Furthermore, the viewer of the content can re-examine previous communication performed when the tag information is associated with the content by viewing the content again after the tag information is associated with the content.

(2-3-2. Effect 2)

In addition, by outputting the input speech or input text contained in the tag information, the viewer of the content can be aware of the emotion of another person when he or she associated the tag information with the content or re-experience the viewer's emotion when the viewer associated the tag information with the content.

<<3. Modifications>>

It should be understood by those skilled in the art that various modifications, combinations, sub-combinations and alterations may occur depending on design requirements and other factors insofar as they are within the scope of the appended claims or the equivalents thereof.

<3-1. Modification 1>

Figure 18:
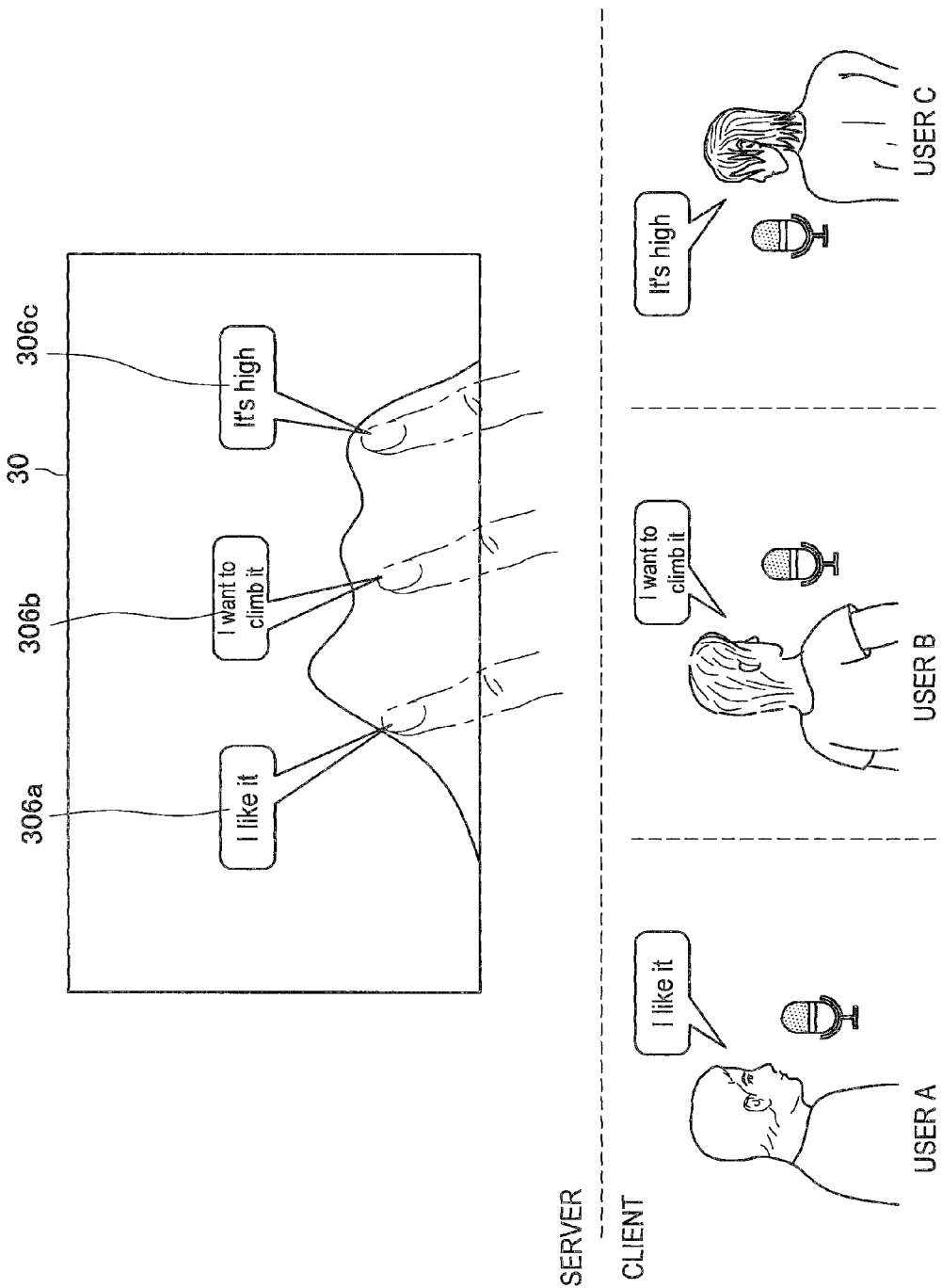
FIG. 18 illustrates an example of a tagging operation performed by a plurality of users according to a modification of the present disclosure.

For example, if the content is available in an open web service, such as a social network service (SNS), a plurality of users can simultaneously associate tag information with the content, as illustrated in FIG. 18.

Note that in some web services, anonymity may be a primary selling point for the sites. Thus, according to a modification 1, the information processing apparatus 10 may convert all the input speeches of the user contained in the tag information into system's synthesized speeches. Thereafter, the converted speech may be output.

According to the modification 1, a plurality of users can easily and unlimitedly append information to the same content. In addition, by outputting the input information input by a user and contained in the tag information in the form of a system sound and favorite voice of the user, the user can provide the emotion experienced at the time of tagging to the plurality of users while maintaining anonymity of the input information.

<3-2. Modification 2>

Furthermore, according to modification 2, the knowledge database 22 can further store a slot table containing the summary of content (refer to, for example, FIG. 19) in association with the content.

An example of the structure of the slot table is described below with reference to FIG. 19. For example, the slot table includes the following entries: a content type 400, a date 402, a place 404, and an event summary 406 in association with one another. In this case, the content type 400 contains the type of content, such as an "image". The date 402 contains a date on which the content is created (e.g., the date of a photo). The place 404 contains the position information regarding the content (e.g., a place at which an image is captured). In addition, the event summary 406 contains, for example, a word extracted from the tag information having the highest level of importance among a plurality of pieces of tag information associated with the content or words that describes the outline of the content.

According to the modification 2, by obtaining the information stored in the slot table from the server 20, the information processing apparatus 10 can display the information regarding the content in a simple form or output the information in the form of speech before reproducing the content. Accordingly, the viewer of the content can remember the information regarding, for example, the creation date of the content before the content is reproduced.

<3-3. Modification 3>

While the above description has been made with reference to the server 20 storing the knowledge database 22, the location of the knowledge database 22 is not limited thereto. For example, the information processing apparatus 10 may store the knowledge database 22.

<3-4. Modification 4>

While the description in section 2-1-7-1 has been made with reference to an example in which after the tag information is associated with the content, the shape of the tag indication sign is changed and displayed, the process is not limited thereto. For example, in modification 4, the information processing apparatus 10 may change the speech input by the user, the input text, the tagged position, or the indication position contained in the tag information in accordance with the operation performed by the user after the tag information is associated with the content.

<3-5. Modification 5>

While the above-described description has been made with reference to the information processing apparatus 10 that is a mobile device, such as a smart phone, the information processing apparatus 10 is not limited thereto. For example, the information processing apparatus 10 may be a server apparatus.

<3-6. Modification 6>

In addition, according to the present exemplary embodiment, a computer program that allows hardware, such as the CPU 150, the ROM 152, and the RAM 154, to function as the above-described configurations of the information processing apparatus 10 can be provided. Furthermore, a recording medium that stores the computer program can be also provided.

Additionally, the present technology may also be configured as below:

(1) An information processing apparatus including:
an output control unit configured to display a sign indicating an indication relationship between a first point associated with tag information and a second point specified by a user in content in a manner that the sign is superimposed over the content, and output input information input by the user and contained in the tag information.
(2) The information processing apparatus according to (1), wherein the sign indicating the indication relationship starts at the first point and points to the second point.
(3) The information processing apparatus according to (1) or (2), wherein the first point and the second point are included in the same image in the content.
(4) The information processing apparatus according to (3), wherein the content contains a plurality of frame images, and
wherein the output control unit displays, at the same position, the sign indicating an indication relationship in a first frame image contained in the content and a second frame image subsequent to the first frame image.
(5) The information processing apparatus according to (3), further including:
an image recognition unit configured to recognize a first object located at the first point and a second object located at the second point in the content,
wherein the output control unit changes one of a position and a length of the sign indicating an indication relationship in accordance with movement of a display position of one of the first object and the second object.
(6) The information processing apparatus according to any one of (1) to (5), wherein the output control unit dynamically changes a display format of the sign indicating an indication relationship from the first point toward the second point in accordance with output of the input information input by the user.
(7) The information processing apparatus according to (1) or (2),
wherein the content contains a plurality of images, and
wherein the first point and the second point are contained in different images in the content.
(8) The information processing apparatus according to any one of (1) to (7), further including:
an operation recognition unit configured to recognize an operation performed on a display screen by the user, and
wherein the output control unit changes a shape of the sign indicating an indication relationship to a shape in accordance with an instruction from the user recognized by the operation recognition unit.
(9) The information processing apparatus according to any one of (1) to (8), wherein when the tag information is selected by the user during reproduction of the content, the output control unit outputs the input information input by the user and contained in the selected tag information.
(10) The information processing apparatus according to any one of (1) to (8),
wherein pieces of the tag information are associated with the content, and
wherein the output control unit outputs the input information input by the user and contained in each piece of tag information in the time order in which the pieces of tag information are associated with the content.
(11) The information processing apparatus according to any one of (1) to (8),
wherein pieces of the tag information are associated with the content,
wherein the information processing apparatus further includes
a language analyzing unit configured to identify a plurality of words from the input information input by the user, and
an importance level calculating unit configured to calculate a level of importance of the tag information by extracting the level of importance of each of the words identified by the language analyzing unit from a database that stores the level of importance of each word, and
wherein the output control unit outputs the input information input by the user and contained in the tag information having the calculated level of importance that is higher than or equal to a predetermined threshold value.
(12) The information processing apparatus according to any one of (1) to (8), further including:
a language analyzing unit configured to identify a plurality of words from the input information input by the user; and
an emphasis level identifying unit configured to identify an emphasis level of each of the words identified by the language analyzing unit from a database that stores the emphasis level of each of the words,
wherein the output control unit displays each word identified in a display format in accordance with the identified emphasis level of each word in a manner that the words are superimposed over the content.
(13) The information processing apparatus according to any one of (1) to (12), wherein the output control unit displays a sign indicating the first point and a sign indicating the second point in different display formats.
(14) The information processing apparatus according to any one of (1) to (13), wherein the input information input by the user is user speech.

(15) The information processing apparatus according to any one of (1) to (15), wherein the input information input by the user is a character string input by the user.

(16) An information processing method including:
displaying a sign indicating an indication relationship between a first point associated with tag information and a second point specified by a user in content in a manner that the sign is superimposed over the content; and
causing a processor to output input information input by the user and contained in the tag information.

(17) A program for causing a computer to function as:
an output control unit configured to display a sign indicating an indication relationship between a first point associated with tag information and a second point specified by a user in content in a manner that the sign is superimposed over the content, and output input information input by the user and contained in the tag information.

What is claimed is:

1. An information processing apparatus, comprising:
a memory capable of storing instructions; and
a central processing unit (CPU) coupled with the memory and configured to:
   display a first sign in a content indicating a first relationship between a first point associated with tag information and a second point specified by a user in the content, wherein the first sign is superimposed over the content;
   output information input by the user and contained in the tag information; and
   change a display format of the first sign which indicates the first relationship from the first point toward the second point based on the output information input by the user.

2. The information processing apparatus according to claim 1, wherein the first sign indicating the first relationship starts at the first point and points to the second point.

3. The information processing apparatus according to claim 1, wherein the first point and the second point are included in a same image of a plurality of frame images of the content.

4. The information processing apparatus according to claim 3,
wherein the content contains the plurality of frame images, and
wherein the CPU is further configured to display, at a same position, the first sign indicating a second relationship in a first frame image of the plurality of frame images contained in the content and a second frame image of the plurality of frame images, wherein the second frame image is subsequent to the first frame image.

5. The information processing apparatus according to claim 3, further comprising:
an image recognition unit configured to recognize a first object located at the first point and a second object located at the second point in the content,
wherein the CPU is further configured to change one of a position or a length of the first sign indicating the first relationship based on a movement of a display position of one of the first object or the second object.

6. The information processing apparatus according to claim 1, wherein the content contains a plurality of images, and wherein the first point and the second point are contained in different images of the plurality of images in the content.

7. The information processing apparatus according to claim 1, further comprising an operation recognition unit configured to recognize an operation on a display screen by the user, and
wherein the CPU is further configured to change a first shape of the first sign indicating a second relationship to a second shape based on an instruction received from the user that is recognized by the operation recognition unit.

8. The information processing apparatus according to claim 1, wherein based on the tag information that is selected by the user at a time of reproduction of the content, the CPU is further configured to output the information input by the user and contained in the selected tag information.

9. The information processing apparatus according to claim 1,
wherein a plurality of pieces of the tag information are associated with the content, and
wherein the CPU is further configured to output the information input by the user and contained in each of the plurality of pieces of tag information based on a time order in which the plurality of pieces of tag information are associated with the content.

10. The information processing apparatus according to claim 1,
wherein the information processing apparatus further includes:
   a language analyzing unit configured to identify a plurality of words from the information input by the user; and
   an importance level calculating unit configured to calculate a level of importance of the tag information by extraction of a level of importance of each of the plurality of words, wherein the each of the plurality of words are identified by the language analyzing unit from a database that stores the level of importance of each of the plurality of words, and
wherein the CPU is further configured to output the information input by the user and contained in the tag information, wherein the output information has the calculated level of importance that is higher than or equal to a determined threshold value.

11. The information processing apparatus according to claim 1, further comprising:
a language analyzing unit configured to identify a plurality of words from the information input by the user; and
an emphasis level identifying unit configured to identify an emphasis level of each of the plurality of words identified by the language analyzing unit from a database that stores the emphasis level of the each of the plurality of words,
wherein the CPU is further configured to display the each of the plurality of words identified in the display format based on the identified emphasis level of the each of the plurality of words, wherein the plurality of words are superimposed over the content.

12. The information processing apparatus according to claim 1, wherein the CPU is further configured to display a second sign indicating the first point and a third sign indicating the second point in different display formats.

13. The information processing apparatus according to claim 1, wherein the information input by the user is user speech.

14. The information processing apparatus according to claim 1, wherein the information input by the user is a character string.

15. The information processing apparatus according to claim 1, wherein the display format of the first sign that indicates the first relationship from the first point toward the second point is changed dynamically.

16. An information processing method comprising: displaying a first sign in a content indicating a relationship between a first point associated with tag information and a second point specified by a user in the content, wherein the first sign is superimposed over the content; outputting information input by the user and contained in the tag information; and changing a display format of the first sign which indicates the first relationship from the first point toward the second point based on the output information input by the user.

17. A non-transitory computer-readable storage medium having stored thereon, computer-executable instructions for causing a computer to execute operations, the operations comprising: displaying a first sign in a content indicating a relationship between a first point with tag information and a second point specified by a user in the content, wherein the first sign is superimposed over the content; outputting information input by the user and contained in the tag information; and changing a display format of the first sign which indicates the first relationship from the first point toward the second point based on the output information input by the user.

* * * * *